March 11, 1969 C. P. PESEK 3,431,921

APPARATUS FOR CHEMICAL ETCHING

Filed Aug. 10, 1966

INVENTOR.
CYRIL PAUL PESEK

BY Adams & Cuayna

ATTORNEYS

INVENTOR.
CYRIL PAUL PESEK
BY
Adams & Cwayna
ATTORNEYS

United States Patent Office 3,431,921
Patented Mar. 11, 1969

3,431,921

APPARATUS FOR CHEMICAL ETCHING

Cyril P. Pesek, Wayzata, Minn., assignor to Colight, Inc., Minneapolis, Minn., a corporation of Minnesota Filed Aug. 10, 1966, Ser. No. 571,512
U.S. Cl. 134—127 2 Claims
Int. Cl. B08b 13/00

ABSTRACT OF THE DISCLOSURE

A complete processing device for loading, performing an etching function, and a rinse and drying section and a conveyor mechanism for conveying the individual elements to be etched entirely therethrough wherein the conveyor will provide a sufficient supporting bed for the plates being carried while providing a minimum masking area for such plates and to provide a changeable masking area such that no particular area of the plate is masked from etching or the other processes while it is being carried through the system. The conveyor mechanism provides a plurality of relatively small support devices with means for feeding the plate onto the next such support device wherein the individual support devices are not in line with those of the first area such that the same area on the plate being etched is not covered in succeeding steps through the process.

In the past various products and techniques have been developed for the chemical etching of flat metal plates in order to leave a desired design. This process has achieved great useage in the printed circuit fields as well as the fields of material forming when the metals utilized are too thin for normal stamping methods.

One great difficulty in chemical etching or chemical milling is the formation of etch patterns wherein the spray or other chemical contacting arrangement develops a higher degree of exposure on certain sections of the material to be etched and therefore does not provide a uniform etch. With the device provided by applicant a uniform etch pattern is developed which is obtained through a unique conveying system wherein the conveyor elements are completely capable of variable position so that no exposure masking effect on any particular section of the material develops.

In etching it is important to develop a high etch factor. The etch factor is defined as the depth of the etch divided by the loss of width in the etch line. This loss of width results from the chemical etch material undercutting the section of material ordinarily protected by the chemical resist material placed thereover. With the apparatus developed by applicant a high etch factor has been obtained and the uniformity of etching is superior to those devices presently available.

It is therefore an object of applicant's invention to provide apparatus for chemical etching of metal plates and the like which will produce a uniform etch entirely across the plate.

It is a further object of applicant's invention to provide a conveyor device for materials to be etched which will support the materials on changeable support areas such that a minimum of masking of these support areas will occur.

It is a further object of applicant's invention to provide apparatus for completing an entire etch process including means for exposing the plate to etching material and subsequently washing the etch from the material such that the product delivered from the apparatus is in finished form.

It is a further object of applicant's invention to provide apparatus for etching which will insure a high etch factor and a uniform etch across the entire plate surface.

These and other objects and advantages of my invention will more fully appear from the following description made in connection with the accompanying drawings, wherein like reference characters refer to the same or similar parts throughout the several views, and in which.

Figures 1, 3:
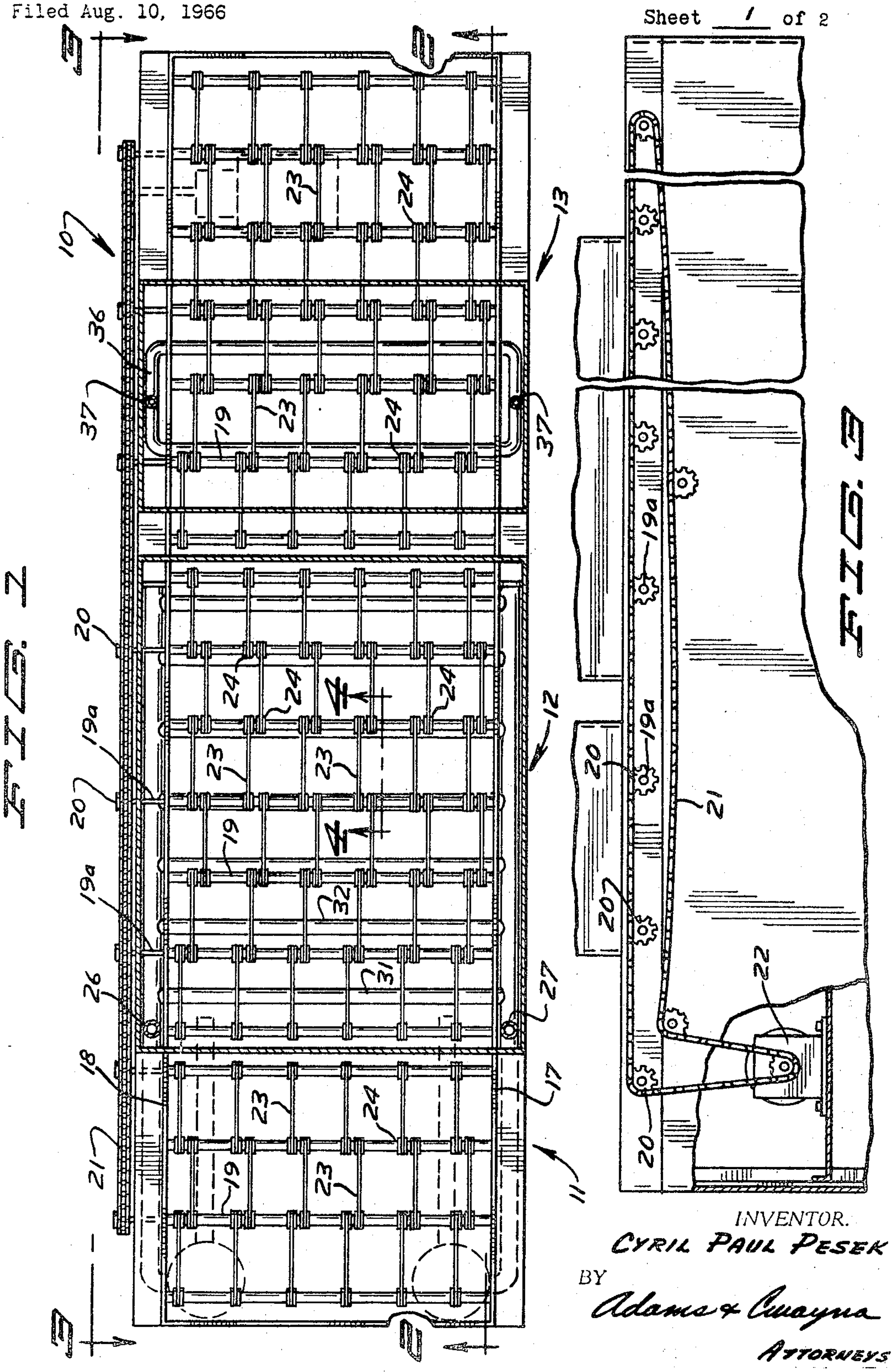
FIG. 1 is a plan view of the conveying portion of an etching machine embodying the concepts of applicant's invention.
FIG. 3 is a partial vertical section taken substantially along line 3—3 of FIG. 1.
Figure 2:
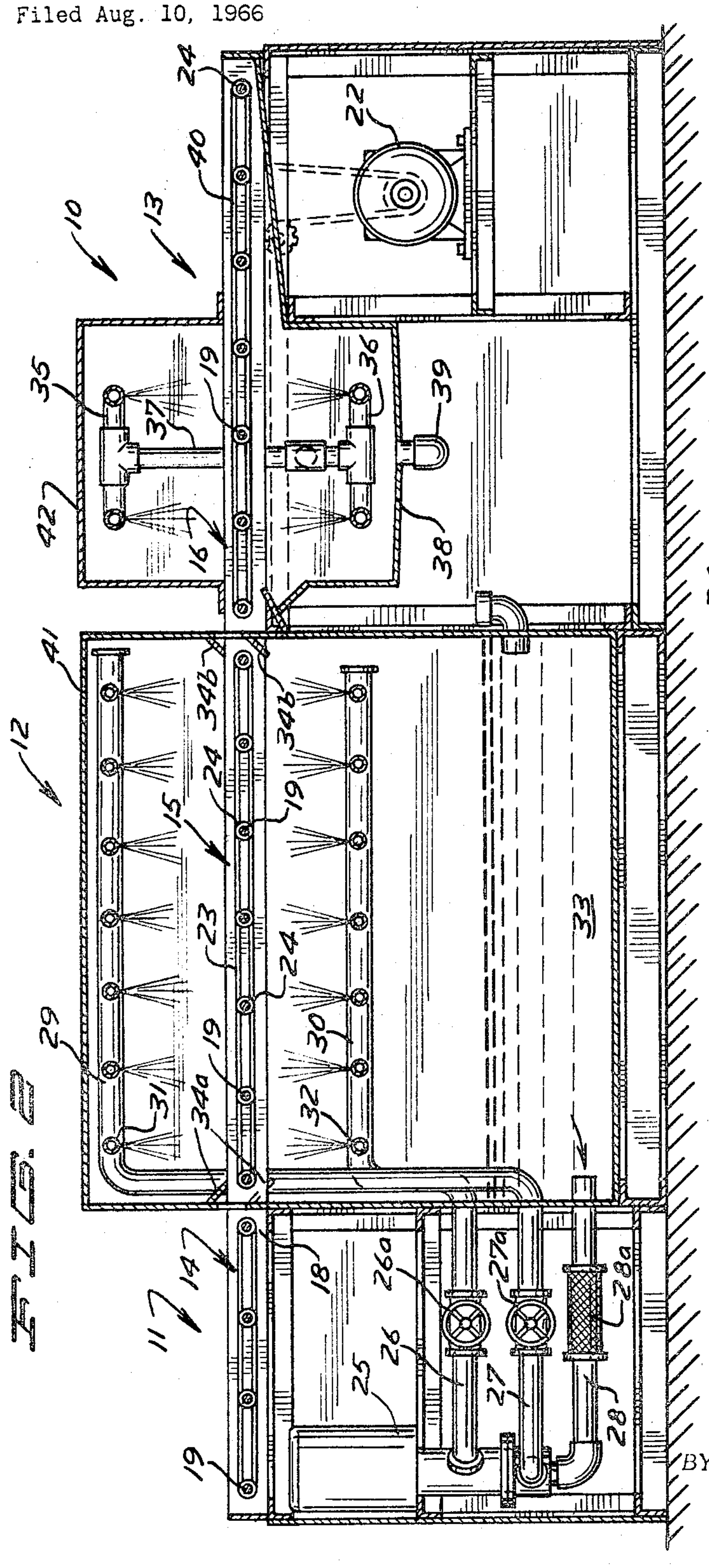
FIG. 2 is a vertical section taken substantially along line 2—2 of FIG. 1.

In accordance with the accompanying drawings the etching apparatus generally designated 10 includes a first loading section 11, an etching section 12 and a rinsing and drying section 13. Each of these sections is provided on completely separable frame and housing members which are designed for ease of shipping but which are connectable to form a serially operated machine.

Each of the individual sections 11, 12 and 13 though independent in function is provided with individual conveyor sections 14, 15 and 16 which when the sections are united form a common bed of travel for the materials to be carried and supported thereon. Conveyor sections 14, 15 and 16 are self contained in each of the individual sections 11, 12 and 13 such that the chemical within the etching section 12 will not then be carried by the conveyor system to the adjacent sections 11, 12 and 13.

Each of the individual conveyor mechanisms 14, 15 and 16 include a pair of spaced side supporting elements 17–18 with a plurality of cross bars 19 rotatably carried thereon. As each of the sections 14, 15 and 16 are identical in form it should be understood that each of the conveyor elements referred to herein is common to each of the sections. Cross members 19 extend entirely between the side supports 17–18 and at least selected of such supports 19 are provided with extensions **19*a* on one end thereof which extend through side supports 18 and are provided with spur gears 20 thereon for driving thereof. A continuous chain member 21 is provided over the entire set of spur gears 20 and as illustrated in FIG. 3 this chain member connects all of the spur gears such that the conveyor sections of each of the three units will be commonly driven. A motor 22 is provided to drive chain 21**.

Figure 5:
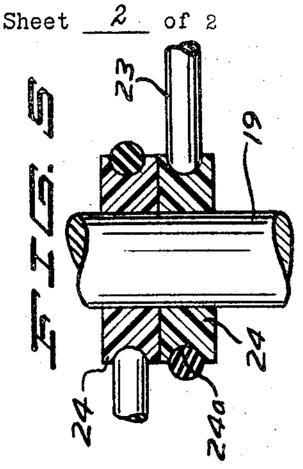
FIG. 5 is a horizontal section taken substantially along line 5—5 of FIG. 4.
Figure 4:
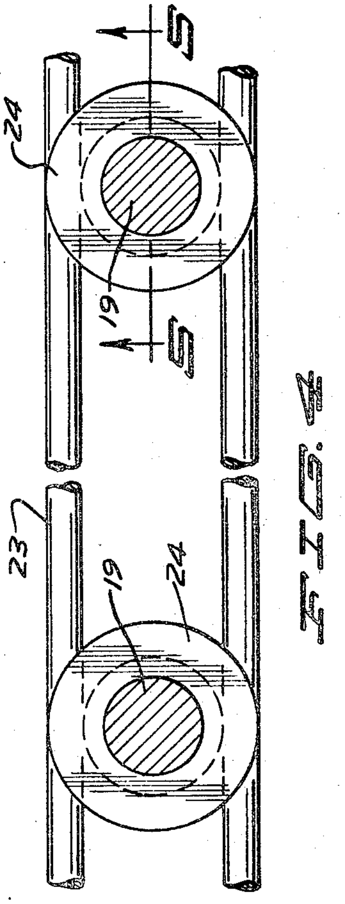
FIG. 4 is a vertical section taken substantially along line 4—4 of FIG. 1.

As best illustrated in FIGS. 1, 4 and 5, each of the rotatable support members 19 is interconnected through flexible connector bands 23 which sections encompass each pair of adjacent bars 19. The bands 23 are as illustrated of limited cross sectional dimension to cover a minimum area. Drive motion from the selected driven bars **19*a* is transmitted through the entire conveyor system through the use of connector bands 23. Mounting members 24 are provided on the individual bar members 19 to engage with and position the connector elements 23 thereon. As best illustrated in FIG. 5 these mounting members 24 are slideably positionable longitudinally on support bars 19 and extend radially outward therefrom. A radial groove 24*a* is provided around the periphery of members 24 to partially capture the connector elements 23 therein. Drive members 24 are arranged to frictionally engage rods 19 and maintain their predetermined position thereon. The purpose of the connector members 23 and the drive elements 24 is to provide a supporting bed for plates to be etched while masking only a limited area of these plates to a chemical spray. The entire conveyor structure then including bars 19, connector elements 23 and drive elements 24 is so designed that a minimum support area is provided and the positionability of drive elements 24** does, as illustrated in FIG. 1, permit varied placement of these support sections such that no blockage or masking pattern results.

The material utilized in the entire etching section 12 must of necessity be resistant to the chemical etching material. Certain metals such as stainless steel are suitable for certain of elements within the etching section while plastics or rubber must be utilized for other of the elements.

The basic concept of the unit is to provide a continuous etching function wherein plates to be etched are loaded on the conveyor loading section 14 directed to the spraying and actual etching section 15 and passed into a washing conveyor section 16 for final discharge after washing.

In the form shown and in order to provide a compact unit the loading section 11 includes a chemical pump mechanism 25 having a pair of outlets 26–27 with valve controls **26*a*–27*a* therein which outlets extend into the etching section 12. A material return line 28 including a filter 28*a* receives fluid from the etching section to return the same to the pump 25** for recirculation.

The chemical spraying and etching section 12 includes manifolds 29–30 with a plurality of spray bars 31–32 extending therebetween to provide a spray directed both upwardly at the convey structure 15 and downwardly at the conveyor structure 15. Etching material is collected after use in the bottom cavity 33 of the etching section 12 and returned to pump 25 through line 28.

One further aspects of the etching section 12 is the splash deflector system **34*a*–34*b* on the entrance and exit sides respectively of the spray section 12 such that the chemical fluid will not spill into the adjacent sections 11 and 13. These splash guards 34*a*–34*b*** may be of any particular design which prevents such spill over action.

The washing and discharge section 13 again includes an upper 35 and lower 36 manifold and spray section receiving washing solution such as water from a common conduit 37. The effect of this section 13 is of course to rinse all etching material from the now etched plates. A collector chamber 38 having a drain 39 is arranged to collect the rinsing material and discharge the same. Again it should be noted that the conveyor system 16 in the washing section provides a minimum masking effect such that total rinsing is obtained. Upon passing through the washing section 13 the etched plates will be directed into a collecting station 40.

As illustrated in the figures the etching section 12 and washing section 13 would be provided with cover elements 41–42 thereover to eliminate any splashing into adjoining areas.

With the structures provided by applicant the plate to be etched may be run through the entire etching process at variable speeds. The speed however will be equal through each of the sections due to the common drive system and connector system utilized on the conveyor section 14, 15 and 16. The basic concepts of the unit are the conveying of plates without repetition of support areas and the use of minimal support areas to insure proper etching exposure and the adjustability of the support areas of the conveyors to permit and insure proper support through the etching process. Naturally with the shiftability of the conveyor structure elements objects of various sizes may be properly supported on the unit with the desired minimum masking. This exposure spray system along with the adjustability of processing speed insures that a proper etch factor will be maintained and whereas now devices commonly produce plates with an etch factor of 3 the device provided by applicant will normally maintain an etch factor of 7 to 10 which is considered most desirable.

It should be obvious that applicant has provided a new and unique element supporting structure for the conveying structure of a chemical etching machine which will insure proper and uniform surface etching.

It will, of course, be understood that various changes may be made in the form, details, arrangements and proportion of parts without departing from the scope of my invention, which generally stated consists in the matter set forth in the appended claims.

What I claim is:

1. Apparatus for chemically etching articles including:

(a) a support frame;

(b) an exposure conveyor or system carried by said frame including:

(1) a plurality of longitudinally spaced, transversely extending, rotatably mounted support bars;

(2) means for driving at least selected of said support bars;

(3) a plurality of transversely spaced and longitudinally arranged interconnecting elements of relatively small cross sectional area in comparison to the length of said support bars, around at least two of said support bars and frictionally contacting the same whereby conveying motion is transmitted to all of said elements and said support bars to provide a conveyor bed of minimal support area to articles carried thereby;

(c) means for exposing the articles to a chemical etching solution as they are carried by said conveyor including at least an upper and lower spray bar arranged with respect to said conveyor; and (d) a plurality of drive members arranged on each of said rod members frictionally engaging the same for rotation therewith but longitudinally shiftable therealong, said members having means on the periphery thereof for drivably engaging said connecting elements.

2. The structure set forth in claim 1 wherein said interconnecting elements are transversely shiftable on said support bars to permit a random pattern of said elements and minimize the masking effect created thereby.

References Cited

UNITED STATES PATENTS

| | | | |
|---|---|---|---|
| 3,082,774 | 3/1963 | Benton et al. | 134—64 XR |
| 3,187,878 | 6/1965 | Harrison et al. | 198—190 XR |
| 3,279,587 | 10/1966 | Gray et al. | 198—190 |
| 3,348,657 | 10/1967 | Fredrikson | 198—127 |

ROBERT L. BLEUTGE, *Primary Examiner.*

U.S. Cl. X.R.

134—68, 131; 198—190